United States Patent
Maloney et al.

(10) Patent No.: US 7,672,928 B2
(45) Date of Patent: Mar. 2, 2010

(54) QUERY FORCED INDEXING

(75) Inventors: Michael J. Maloney, Seattle, WA (US); Yevgeniy A. Samsonov, Redmond, WA (US); Chris J. Guzak, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 10/955,937

(22) Filed: Sep. 30, 2004

(65) Prior Publication Data

US 2006/0069672 A1 Mar. 30, 2006

(51) Int. Cl.
*G06F 17/30* (2006.01)

(52) U.S. Cl. .............................. 707/3; 707/2; 707/101; 718/101

(58) Field of Classification Search ..................... 707/2, 707/3, 101; 718/101
See application file for complete search history.

(56) References Cited

U.S. PATENT DOCUMENTS

| | | | | | |
|---|---|---|---|---|---|
| 5,701,469 | A | * | 12/1997 | Brandli et al. ............... | 707/102 |
| 5,960,423 | A | * | 9/1999 | Chaudhuri et al. ............. | 707/2 |
| 5,974,409 | A | * | 10/1999 | Sanu et al. ..................... | 707/3 |
| 6,026,406 | A | * | 2/2000 | Huang et al. ................. | 707/100 |
| 6,070,158 | A | * | 5/2000 | Kirsch et al. ................... | 707/3 |
| 6,185,551 | B1 | * | 2/2001 | Birrell et al. ................... | 707/3 |
| 6,983,322 | B1 | * | 1/2006 | Tripp et al. .................. | 709/225 |
| 2002/0055920 | A1 | * | 5/2002 | Fanning et al. ................. | 707/3 |
| 2003/0217033 | A1 | * | 11/2003 | Sandler et al. .................. | 707/1 |
| 2003/0225746 | A1 | * | 12/2003 | Braun et al. ................... | 707/3 |
| 2003/0229626 | A1 | * | 12/2003 | Nayak ........................... | 707/3 |
| 2004/0002961 | A1 | * | 1/2004 | Dettinger et al. ............... | 707/3 |
| 2004/0230571 | A1 | * | 11/2004 | Robertson ....................... | 707/3 |
| 2005/0027741 | A1 | * | 2/2005 | Eichstaedt et al. ........ | 707/104.1 |
| 2005/0027742 | A1 | * | 2/2005 | Eichstaedt et al. ........ | 707/104.1 |
| 2005/0076022 | A1 | * | 4/2005 | Wu et al. ....................... | 707/3 |
| 2005/0076023 | A1 | * | 4/2005 | Wu et al. ....................... | 707/3 |
| 2005/0154710 | A1 | * | 7/2005 | Ruhlow et al. ................. | 707/3 |
| 2005/0203940 | A1 | * | 9/2005 | Farrar et al. ................. | 707/102 |
| 2005/0223027 | A1 | * | 10/2005 | Lawrence et al. ....... | 707/103 R |
| 2005/0234871 | A1 | * | 10/2005 | Martin et al. .................. | 707/3 |
| 2005/0234875 | A1 | * | 10/2005 | Auerbach et al. .............. | 707/3 |
| 2006/0036580 | A1 | * | 2/2006 | Stata et al. ..................... | 707/3 |
| 2007/0203925 | A1 | * | 8/2007 | Sandler et al. .............. | 707/100 |

OTHER PUBLICATIONS

Vijayshankar Raman et al , "Partial Results for Online Query Processing", IBM Almaden Research Center, ACM Sigmod, 2002, pp. 275-286.*
Sattler, Kai-Uwe, et al., "Autonomous Query-driven Index Tuning," *IEEE*, 2004, 10 pgs.

* cited by examiner

*Primary Examiner*—Apu M Mofiz
*Assistant Examiner*—Hung D Le
(74) *Attorney, Agent, or Firm*—Merchant & Gould, P.C.

(57) ABSTRACT

A searchable index is created using a query process and an indexing process. The query process cooperates with the indexing process to catalogue items that are located within a specified search scope. Previously indexed items are evaluated to ensure that their indexes are up-to-date. Items that are out-of-date have unreliable indexes that should be updated. Items to be indexed within the specified search scope are grouped in batches for processing. As processing of each batch is completed their respective indexing results become available such that partially indexed search scopes are useable while the indexing process continues. Since indexing results trickle in on an ongoing basis, users are permitted to process and/or view indexing results without waiting for the complete indexing process to be completed.

23 Claims, 7 Drawing Sheets

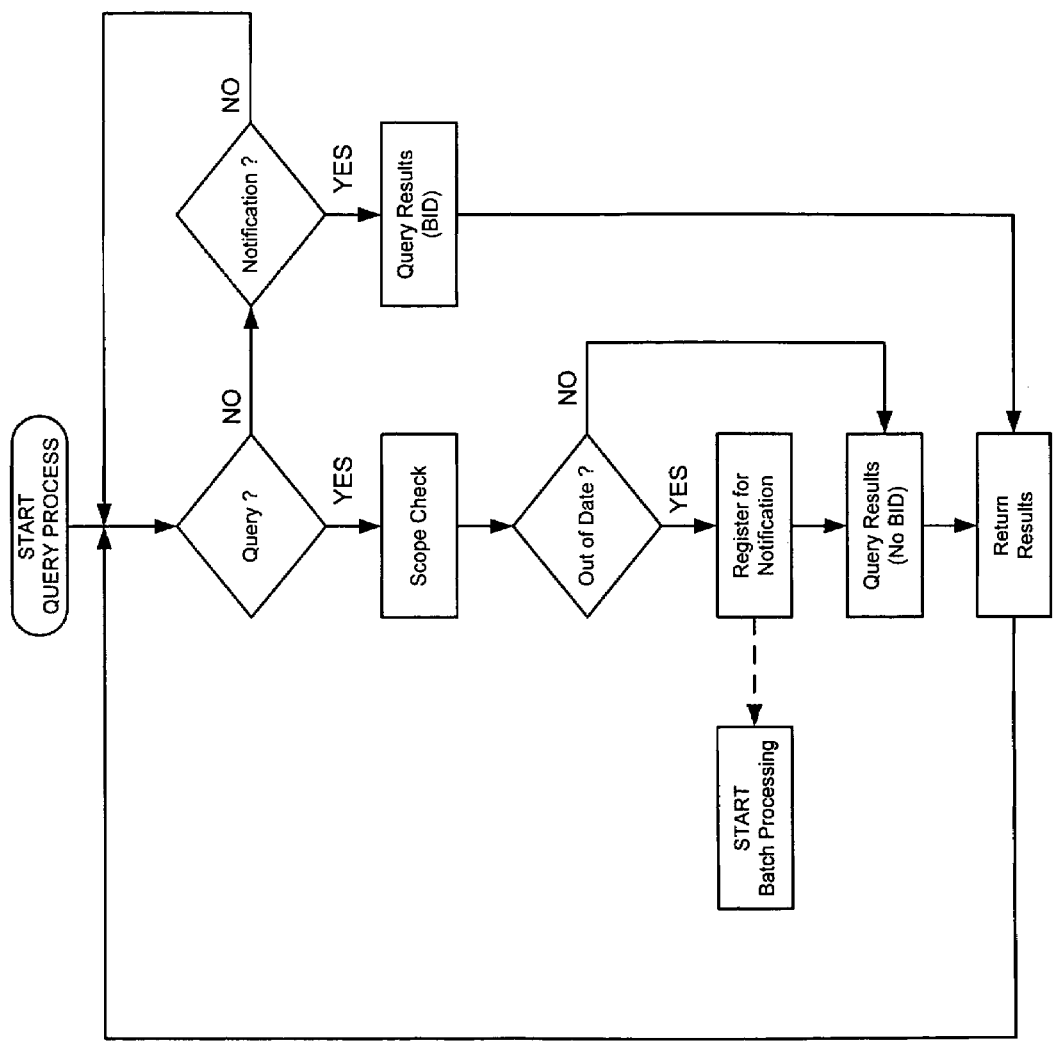

QUERY FORCED INDEXING

BACKGROUND OF THE INVENTION

Indexing services can be used on a computer to create a catalog or "index" to searchable information. The information typically consists of references to files on the computer's file system and text that is found in those files. For example, an index can be created for word processing documents that are identified by their document name, including the file path, and searchable text that is extracted from the content of the corresponding word processing documents. After the index is created, a user can review the search results to locate the word processing documents that include the specified key search term.

SUMMARY OF THE INVENTION

The present invention is directed at providing a user with a method and system for creating searchable indexes.

Briefly stated, embodiments of the present invention are related to a searchable index that is created using a query process and an indexing process. The query process cooperates with the indexing process to catalogue items that are located within a specified search scope. Previously indexed items are evaluated to ensure that their indexes are up-to-date. Items that are out-of-date have unreliable indexes that should be updated. Items to be indexed within the specified search scope are grouped in batches for processing. As processing of each batch is completed their respective indexing results become available such that partially indexed search scopes are useable while the indexing process continues. Since indexing results trickle in on an ongoing basis, users are permitted to process and/or view indexing results without waiting for the complete indexing process to be completed.

According to one aspect of the invention, a searchable index is created using a query process and an indexing service that cooperate with one another such that the user may receive and/or view search results in an ongoing basis while the search is underway. This allows users to view partial search results before the indexing process is completed. A data store can be used to create and update a structure such as a table that maintains the search results and other related information.

According to another aspect of the invention, the querying process checks all of the items to be indexed according to a user selected scope to determine which of the currently indexed items are up-to-date. The query process can subsequently notify the indexing service to crawl the user selected scope to create the index.

According to yet another aspect of the invention, the indexing service is arranged to batch process groups of items such that the frequency of reported partial search results minimizes unnecessary delays. The batch process groups may be selected according to a priority rule, logical relationships between items in the group, or some other set of rules. The user may terminate the search prior to completion of all batches. The indexing service may be configured to continue indexing the remaining items at a reduced priority level such that the user experience is not detracted by the ongoing background process of indexing.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

FIG. 5. is a diagram illustrating processing flows in an example query process;

DETAILED DESCRIPTION OF THE PREFERRED EMBODIMENT

Figure 1:
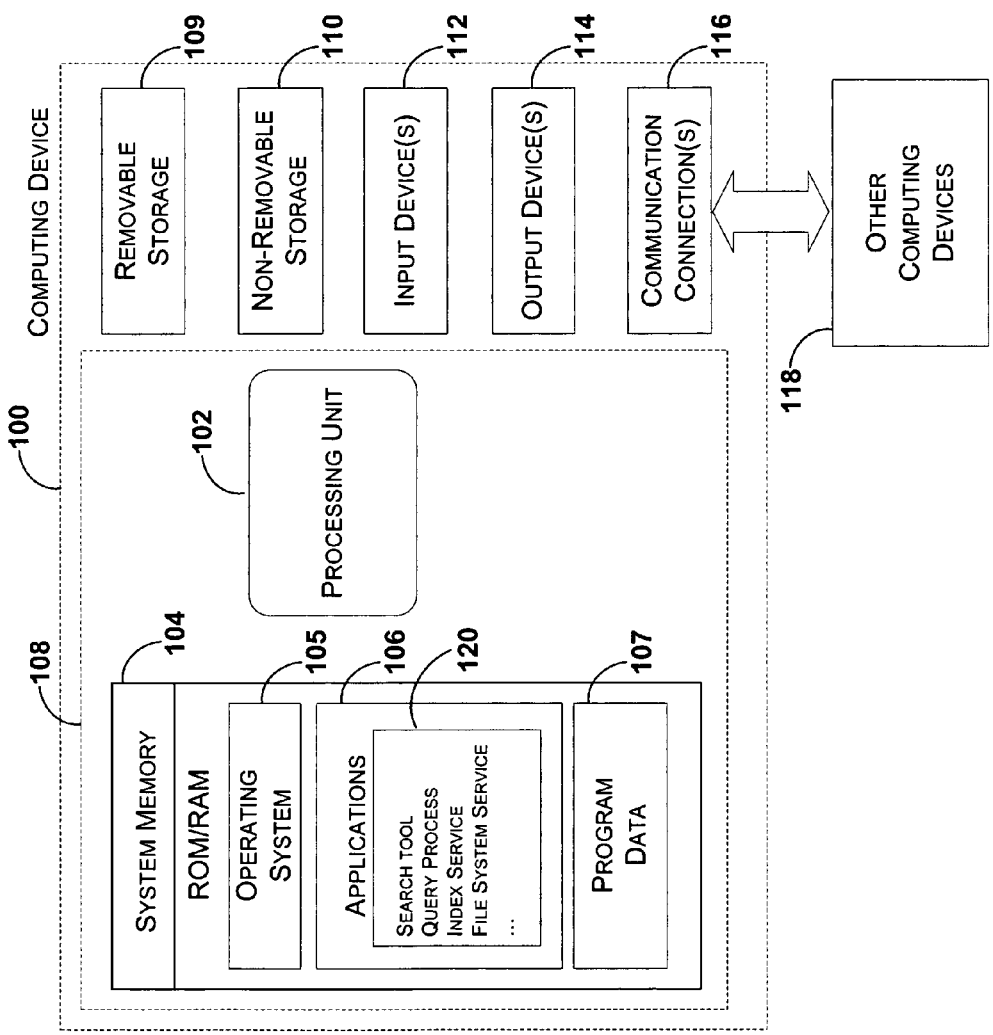
FIG. 1 illustrates an exemplary computing device that may be used in an example embodiment of the present invention.

Embodiments of the present invention will be described in detail with reference to the drawings, where like reference numerals represent like parts and assemblies throughout the several views. Reference to various embodiments does not limit the scope of the invention, which is limited only by the scope of the claims attached hereto. Although many of the examples described herein refer to file systems and searchable indexing of the file system, the indexing methods are not limited to file systems. The described indexing system and method is equally applicable to any other application program, database, service, or system that may benefit from an indexing service, including but not limited to: email applications, databases, contact managers, help systems, file services, web content servers, web page hosting services and search tools generally. The examples set forth in this specification are not intended to be limiting and merely set forth some of the many possible embodiments for the claimed invention.

Illustrative Operating Environment

With reference to FIG. 1, an example system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a user interface such as a search tool, a query process, an index service, an email application program, a contact manager program, a database program, a file system service, or some other service, process or program 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Query System

Figure 2:
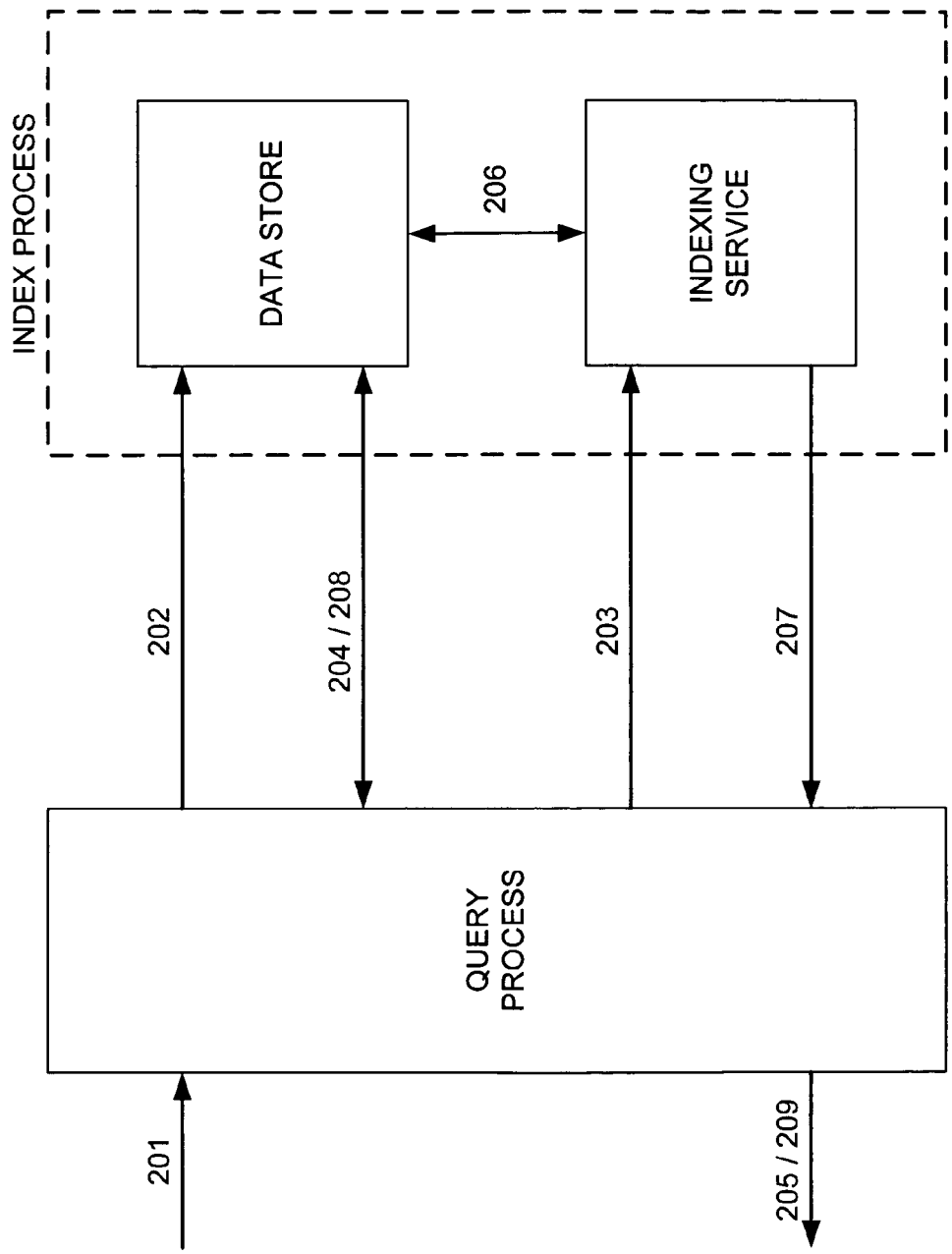
FIG. 2 is a diagram illustrating an example query indexing system.

FIG. 2 illustrates a query system that is arranged in accordance with at least one embodiment of the present invention. In a simplest implementation, the system employs a query process and an index process. The index process may be logically divided into a data store and an indexing service. In one implementation, the data store and the indexing service may be logical partitions that are located within a single program module. In another implementation, the data store and the indexing service are located in separate modules on a single computing device. In still another implementation, the data store and the indexing service are located in separate modules on separate computing devices. In yet another implementation, the data store and the indexing services are located on different virtual machines such as a client and host within the same physical computing device.

The query process receives index request 201 from a user through a user interface or some other configuration that is configurable by a user. The query process processes index request 201 and interacts with the data store (e.g., retrieving data through request 202) to determine if all of the items within index request are currently indexed and up-to-date. When the index request is not currently up-to-date, the query process notifies the indexing service to begin indexing the identified index request through notification 203. The query process communicates with the data store to retrieve initial results 204, which are already indexed and up-to-date. Initial results 204 are received by the query process and returned to the user as data 205, which can be retrieved and displayed on an user interface such as a graphical display.

When the currently indexed items from the data store are incomplete with respect to the full scope of the index request, additional indexing must be performed. In this instance, the indexing service enumerates items that have not yet been indexed (or are stale) and initiates indexing for every remaining item. Batch processing is used by the indexing service to break the remaining items into groups such that partial indexing results can be retrieved until all of the items are indexed. The indexing service communicates indexing results 206 to the data store as they are completed, and sends notifications 207 to the query process as each batch is completed. The query process retrieves batch index results 208 from the data store after receiving notification of batch completion. The query process returns the batch processing results to the user as data 209, which can also be retrieved and displayed on the user interface. Batch indexing continues until either all batches are processed or the indexing process is terminated.

Queries result in searchable/reviewable indexes faster than those observed in other conventional implementations. The indexes are created dynamically such that the partially indexed results are displayed while the remaining indexing continues (e.g., in a background process). Query results for previously indexed documents are reused, and supplemented with the additional dynamic indexing methods described above.

The indexing process is typically configured to execute on a client machine. The client machine may be configured to operate as a virtual machine that serves as both client and host/server for various purposes. The items that are indexed can be physically located on the client machine, on a host machine (either the same physical machine as the client or a different machine), and/or across one or more networked system (e.g., LAN, WAN, UWAN, etc.). The items that can be indexed can consist of any data, document, executable, or any other information that can exist in a searchable system. Example items include program objects, macros, scripts, word processing documents, text documents, spreadsheet documents, graphical images, data files, email files, contact databases, or any other appropriate form of stored information that may exist on the system.

The indexing query to the query process may designate a scope such that a limited portion of the searchable space (e.g., a portion of a file system, a user's emails, a groups project workspace, etc.) is searched for a particular query. Efficiency of the indexing process is improved by implementing batched indexing rather than handling single documents at a time. The batch size can be adjusted so that the trickling in of indexing results is more frequent and the overall user experience is enhanced. Results for each batch are returned to the query process. The process is continued until the index is up-to-date with respect to the selected scope. The data store can consist of a database, a data construct such as a table, or any other appropriate mechanism that can store information that relate items within the specified scope to indexing key terms. In general, the data store can be any data construct that includes a persistent queue that tracks changes to the items in the specified scope.

General Processing Sequence

Figure 3:
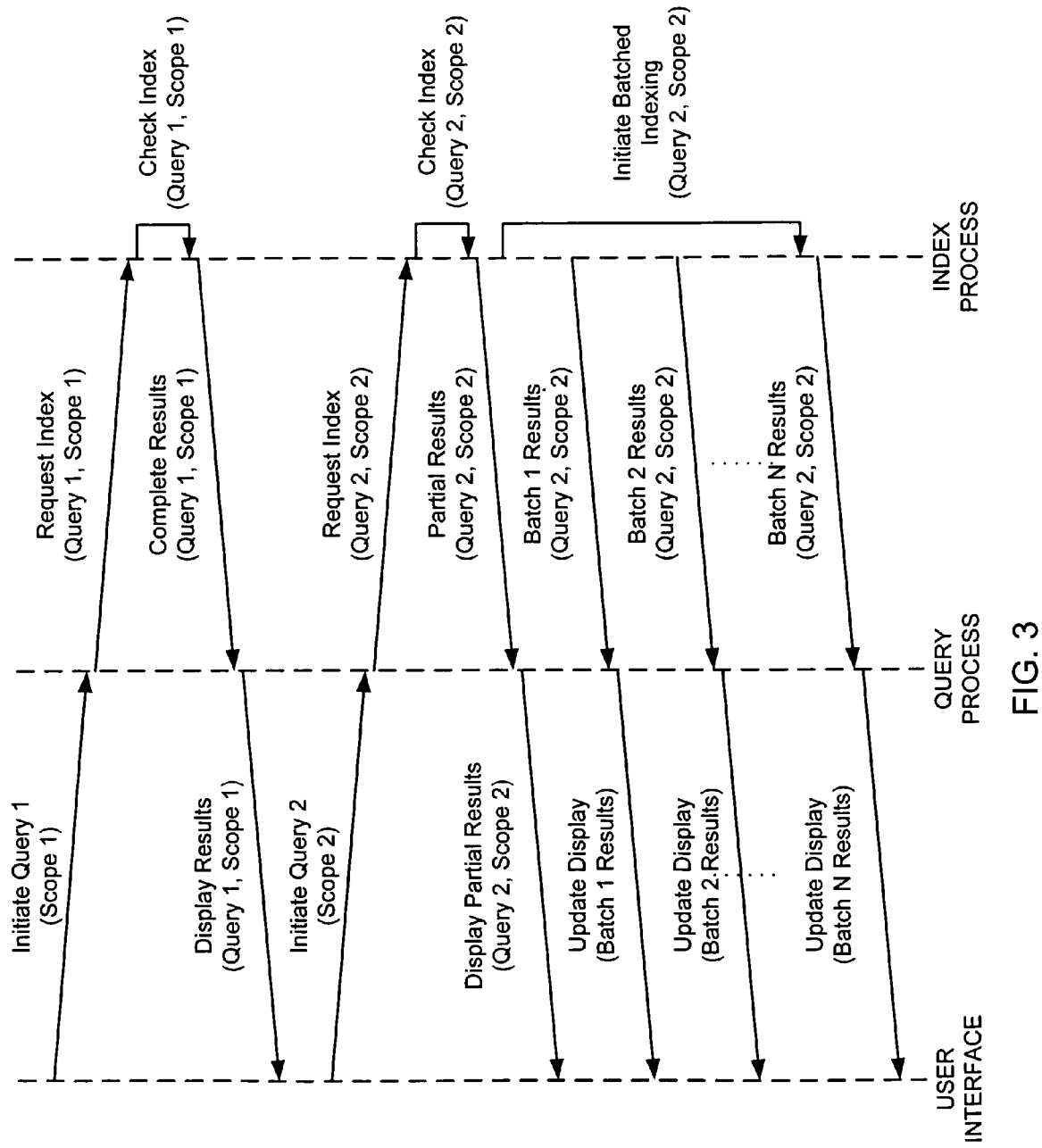
FIG. 3 is a diagram illustrating a sequence of processing flows in another example query indexing system.

FIG. 3 is a diagram illustrating a sequence of processing flows in another example query indexing system that is arranged in accordance with at least one embodiment of the present invention. The example processing flow is divided into three logical processing portions, namely, a user interface, a query process, and an index process. In example implementations the query process, index process and user interface may be combined into a single module, or separated into further logical partitions.

The example process flow illustrated in FIG. 3 includes two queries that have two separate designated scopes (SCOPE 1, and SCOPE 2). Initially, an indexing query is initiated through a user interface such as a search engine. Each indexing query has a limited search domain (e.g., a particular portion of the file system, a user access area, etc.) that is designated as the "scope" of the search.

In a first example, an indexing query (Initiate Query 1) is communicated from the user interface to the query process, where the indexing query is bound by search scope 1. The query process in turn sends a request for an index (Request Index) to the index process using search terms (e.g., text strings) from the request over the designated search scope (Scope 1). The index process checks for an existing index (Check Index) for the query (Query 1) within the designated scope (Scope 1). For this first example, the search terms (or key terms) that were included in the query (Query 1) are fully indexed within the selected scope (Scope 1), and the index process returns the complete search results (Complete Results) to the query process. The query process in turn sends the indexing results to the user interface, which can display the indexing results (Display Results).

In a second example, a second indexing query (Initiate Query 2) is communicated from the user interface to the query process, where the second indexing query is bound by search scope 2. The query process again sends the request for an index (Request Index) to the index process using search terms (e.g., text strings) from the request over the designated search scope (now Scope 2). The index process checks for an existing index (Check Index) for the query (Query 2) within the designated scope (Scope 2). For this second example, the search terms (or key terms) that were included in the query (Query 2) are not fully indexed within the selected scope (Scope 2), and the index process returns partial search results (Partial Results) to the query process. The query process in turn sends the partial indexing results to the user interface for display (Display Partial Results). The partial results corresponds to previously indexed items from a previous indexing operation. Recognizing that the indexing results are not complete, the index process initiates a batched indexing procedure to handle the indexing of the remaining items within the selected scope (Scope 2). In general terms, the batching procedure applies rules to the remaining items and creates groupings of these items for indexing. Example batching procedures will later be described in further detail. As each batch of indexes are completed the batch results (e.g., Batch 1 Results, Batch 2 Results, . . . , Batch N results) are reported to the query process. As the batch results are received, the display on the user interface (if applicable) is updated to indicate the additionally indexed items.

Example Detailed Processing Sequence

Figure 4:
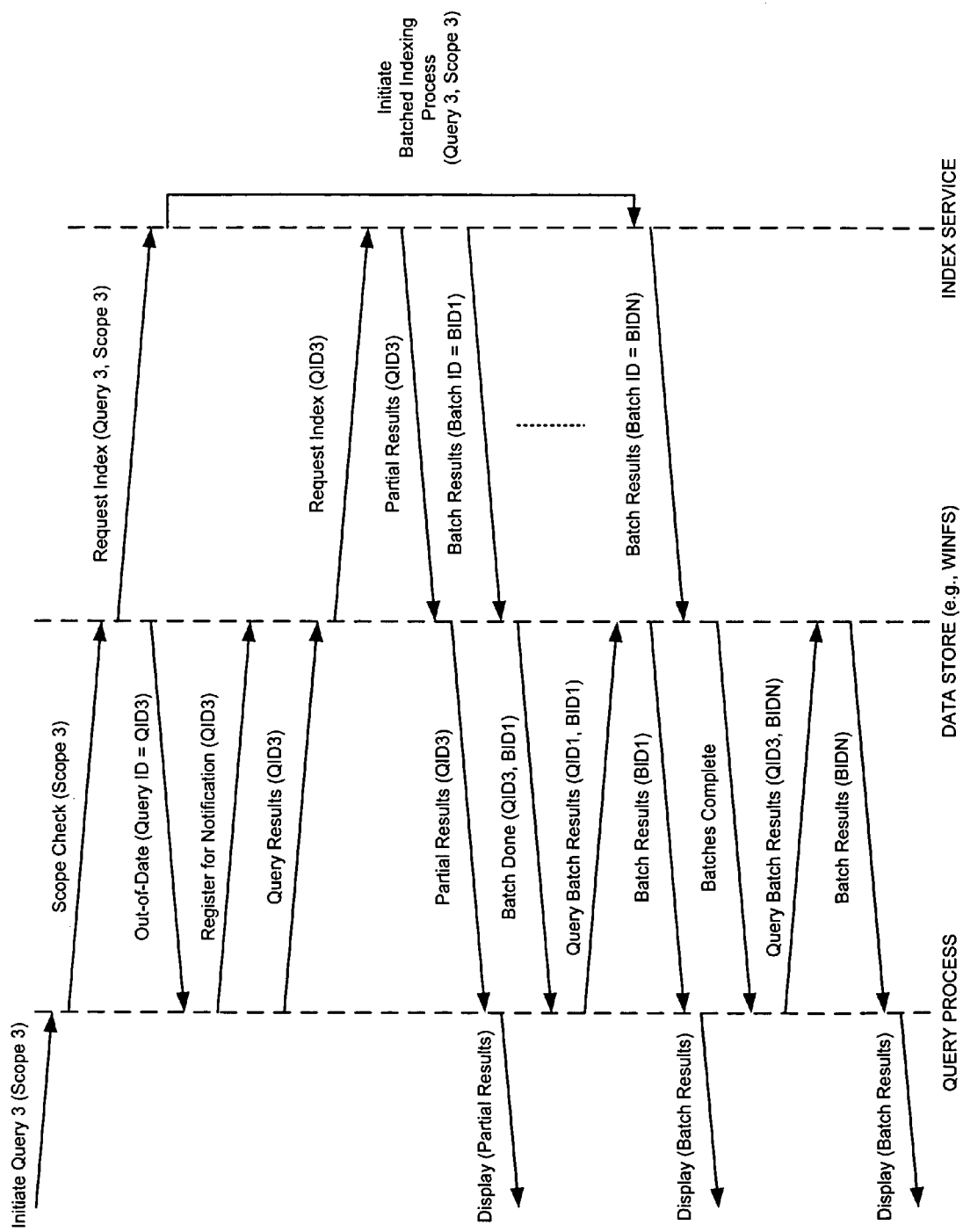
FIG. 4. is a diagram illustrating a sequence of processing flows in still another query indexing system.

FIG. 4 is a diagram illustrating a sequence of processing flows in still another query indexing system that is arranged in accordance with at least one embodiment of the present invention. The example processing flow is divided into three logical processing portions, namely, a query process, a data store (e.g., the WINFS data structures), and an index service. In other example implementations, the query process, data store and index service may be combined into a single module, or separated into further logical partitions.

In a third example, and indexing query (Initiate Query 3) is communicated to the query process through some sort of user interaction, where the indexing query is bound by another search scope (Scope 3). The query process in turn communicates with the data store (e.g., an SQL request to a database) to determine if the query and the selected scope (Query 3, Scope 3) is current. For this third example, the data store does not include an index for the query over the selected scope and the data store communicates with the index service to request indexing (Request Index), which is then initiated with a batched indexing process. The data store also returns an out-of-date indicator (Out-of-Date) to the query process along with an identifier (e.g., Query ID=QID3) corresponding to the requested indexing (Query 3, Scope 3). The query process can then registers for notifications with the data store for all indexing results that are associated with the query index (QID3), and sends a request to the data store for the indexing results (Query Results). The data store communicates with the index service (Request Index) to request and receive results (Partial Results) related to the query index (QID 3). The partial results are retrieved by the query process from the data store for further processing and/or display (Display).

Recognizing that the indexing results are not complete, the index process initiates a batched indexing procedure to handle the indexing of the remaining items within the selected scope (Scope 3). As each batch of indexes are completed the batch results (Batch Results) are reported to the query process with reference to a batch identifier (Batch ID=BID1, BID2, . . . , BIDN). Once the batch results are received by the data store, a notification is communicated to the query process (Batch Done) that indicates the Query Id (QID3) and the Batch ID (BIDx) for the completed batch. Once notified of completion, the query process can request retrieval of the specified batch results. After all batches are processed, the data store notifies the query process that the last batch is completed and retrieval of the final batched indexing results can be retrieved by the query process from the data store. The query process can then terminate the registration with the data store or simply drop the logical connection handle.

The format that is employed for storing indexing information in the data store is unimportant. Data structures, data bases, and other specific data types can be arranged to provide sufficient information to index items according to text strings, as well as other information such as locations with the item (e.g., a position within a word processing document). For illustration purposes, the following table is provided to illustrate the types of indexing information that can be stored therein:

TABLE I

Example Index Table

| Text String | Item Identifier | Occurrence in Item |
|---|---|---|
| Apple | Doc_ID1 | 1, 7, 9 |
|  | Doc_ID9 | 8 |
|  | Doc_ID11 | 4, 5 |
| Pie | Doc_ID2 | 3 |
|  | Doc_ID9 | 4 |

The scope and version stamp associated with each item can be found in another data table such as illustrated below. For this example, the scope is determined according to relative file path names, http addresses, or absolute file path names.

TABLE II

Example History/Version Table

| Item Identifier | Scope | Version Stamp |
| --- | --- | --- |
| Doc_ID1 | ../root/path1 | 37 |
| Doc_ID2 | http://my.home/my.account | 150 |
| Doc_ID9 | C:/ | 101 |
| Doc_ID11 | D:/myfiles | 29 |

The version stamp can be used by the various processes to determine if a particular document has been modified using a procedure such as a hash of the document or item, a creation/revision date and time, or some other criteria to identify the version of the item. A version table can be employed to track the current version of the item, while a history table can be employed to track the current version of the item that is indexed in the index table.

Example Process Flows

Example process flows are illustrated by way of FIGS. 5-10. Each of the process flows can be configured to operate a separate process that is running in a multi-tasking or multi-threaded environment, or as integrated processes.

FIG. 5. is a diagram illustrating processing flows in an example query process, arranged in accordance with at least one embodiment of the present invention. The query process may be idle until it either receives a query, or until a notification related to a previous query is received. When a notification is received by the query process, the query process reviews the notification and queries for the results from another process based on the Batch ID (BID). When a query is received by the query process, the query process initiates a scope check for the query to determine whether or not the indexes for the selected scope are out-of-date. When the scope is out-of-date, the query process registers for notification and initiates batch processing in another process. After registration, or when the scope is up-to-date, the query process requests index results for any partial results that may be available and returns those results.

Figure 6:
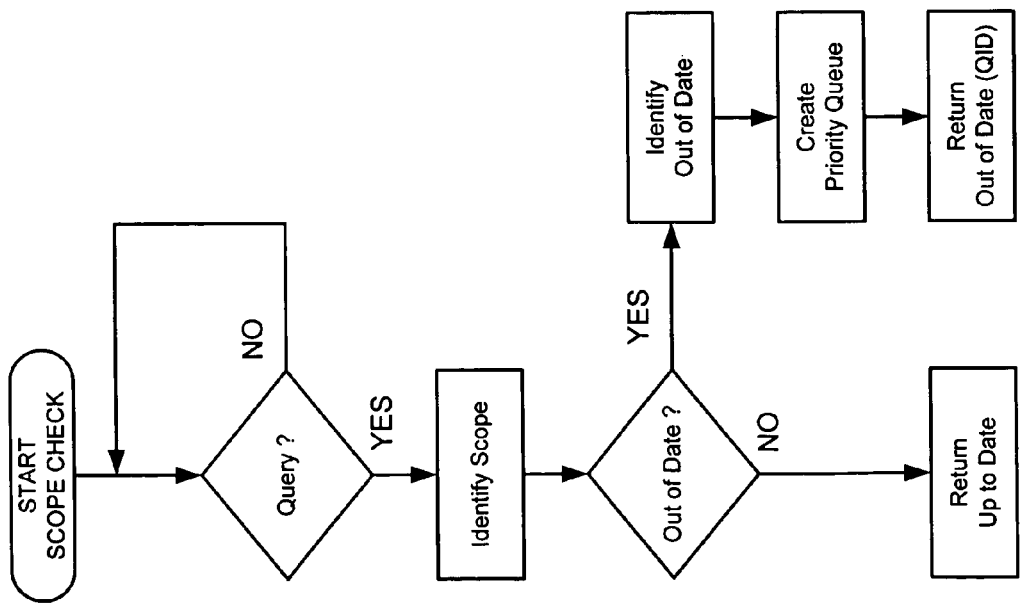
FIG. 6 is a diagram illustrating processing flows in an example scope check process.

FIG. 6 is a diagram illustrating processing flows in an example scope check process, arranged in accordance with at least one embodiment of the present invention. The scope check process is idle until a query is received. Upon receipt of a query, the scope check process identifies the scope (e.g., pathname) found in the request and determines if the items in the selected scope are out-of-date. Each item has an associated version number, as well as the historical version number that corresponds to the version number that was used to create the last indexing associated with the item. When any one of the items has a difference in the indexed version number and the current version number, the index is out-of-date with respect to that item. The out-of-date items are identified, sorted into priority queues, assigned a Query ID (QID) for indexing, and a notification is returned indicting that items are out-of-date. When all of the indexed versions and the current versions are the same, a notification is returned indicating that the items are up-to-date.

Figure 7:
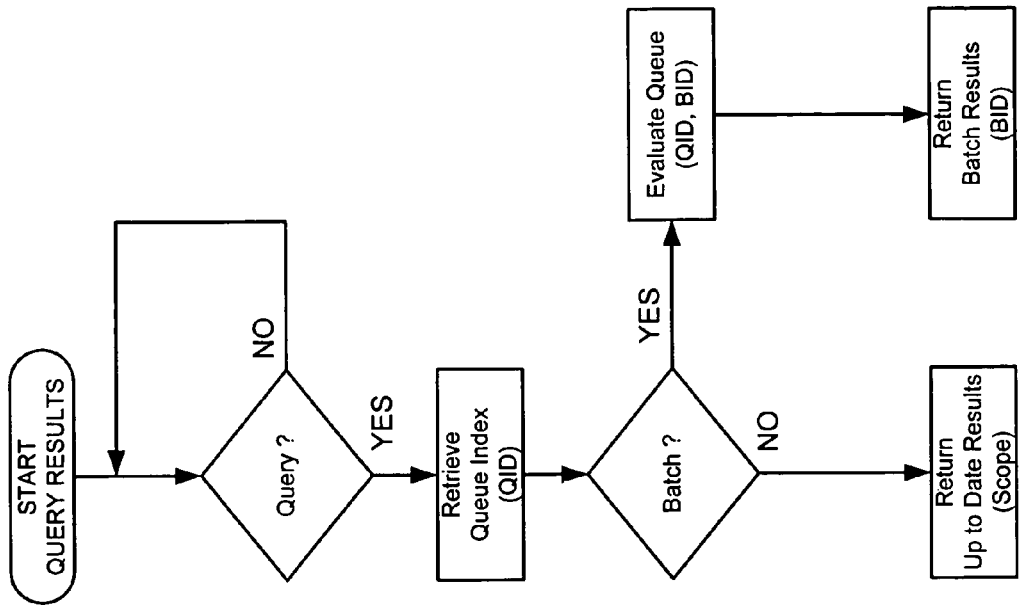
FIG. 7 is a diagram illustrating processing flows in an example query results process.

FIG. 7 is a diagram illustrating processing flows in an example query results process, arranged in accordance with at least one embodiment of the present invention. The query results process is idle until a query is received. Upon receipt of a query, the query results process retrieves the queue index associated (QID) with the query the scope, and determines if the query indicates a batch process. When the queue index does not indicate at batch process (No BID), notification is returned to indicate that the results are up-to-date. For queue indexes that indicate a batch process, the priority queues for the identified batch process (QID, BID) are evaluated and the batch results are returned with reference to the batch identifier (BID).

Figure 8:
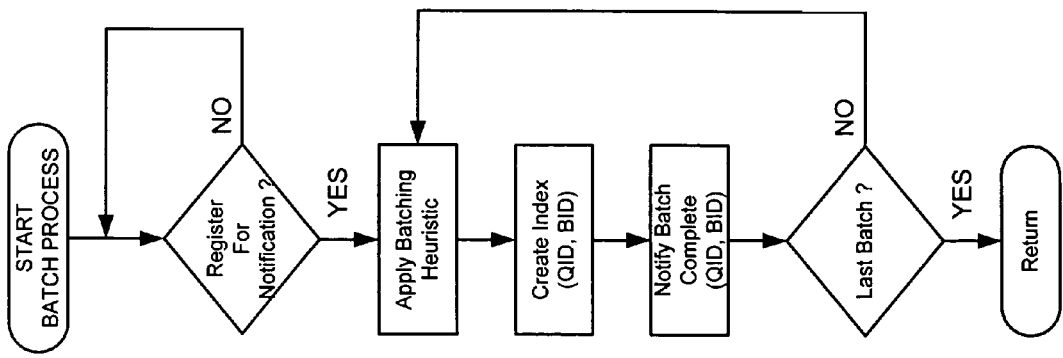
FIG. 8 is a diagram illustrating processing flows in an example batch process.

FIG. 8 is a diagram illustrating processing flows in an example batch process, arranged in accordance with at least one embodiment of the present invention. The batch process is idle until a notification registration is requested. After the registration request is received, a batching heuristic is applied to the items in the selected scope to determine a groupings of items for indexing. Each grouping is indexed according to the query identifier (QID) and a batch identifier (BID), and a notification of the completion of the batching process is returned. After all of the items in the requested query are batched, the batch process returns to the idle state.

Figure 9:
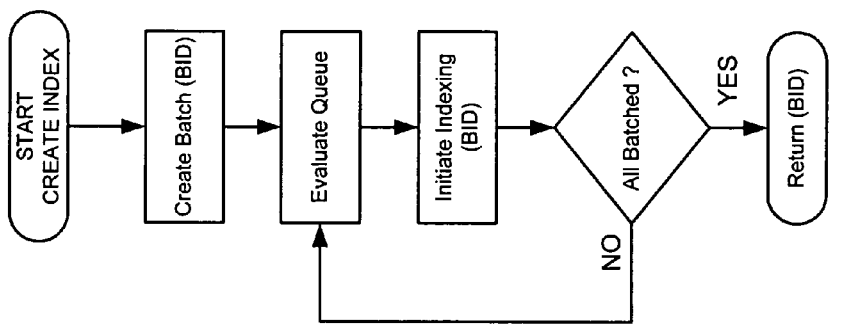
FIG. 9 is a diagram illustrating processing flows in an example create index process.

FIG. 9 is a diagram illustrating processing flows in an example create index process, arranged in accordance with at least one embodiment of the present invention. A batch identifier (BID) is created and the queues from the batching process is evaluated for highest priority items. Indexing is initiated for all of the items in the highest priority batches until all batches are processed.

Figure 10:
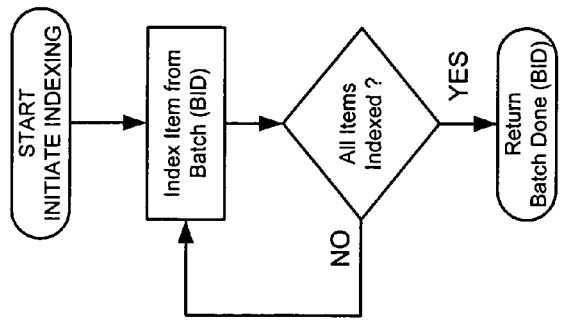
FIG. 10 is a diagram illustrating processing flows for an initiate indexing process, arranged in accordance with at least one embodiment of the present invention.

FIG. 10 is a diagram illustrating processing flows for an initiate indexing process, arranged in accordance with at least one embodiment of the present invention. Each item associated with the batch identifier (BID) is indexed in turn until all items are indexed. Notification is returned when the batch is completely indexed.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for indexing items located within a predetermined scope in response to a search query, comprising:

receiving the search query; wherein the search query comprises one or more terms;

checking an up-to-date status of indexes associated with the search query within the predetermined scope in response to receiving the search query; wherein each of the indexes includes searchable information that is used to locate files that are stored separately from each of the indexes; wherein checking the up-to-date status includes: when a search query is received, determining a portion of the items within the predetermined scope that includes items that were indexed before the search query is received and are unchanged since the items were indexed and determining whether each term within the search query is contained within the index;

retrieving partial results that include the portion of the items within the predetermined scope that were previously indexed and unchanged since the last indexing;

allocating an item for batch processing when the item has changed since the last indexing;

allocating the item for batch processing when the item is not indexed;

initiating batched indexing for items allocated for batch processing; and retrieving batch results for batch processes that have completed indexing; wherein the batch results are retrieved in response to receiving the search query.

2. The method of claim 1, further comprising: retrieving complete results when all of the items within the predetermined scope were previously indexed and the items are unchanged since the last indexing.

3. The method of claim 1, further comprising: displaying the partial results prior to completion of indexing of one or more batch processes.

4. The method of claim 3, further comprising: displaying the batch results when the corresponding batch process has completed indexing.

5. The method of claim 1, wherein checking indexes for indexing items located within the predetermined scope comprises: identifying the predetermined scope, cataloguing items that are found within the predetermined scope, and determining an indexing status of whether the indexing is up-to-date with respect to each item found with the predetermined scope.

6. The method of claim 1, wherein determining an indexing status comprises at least one member of a group comprising: evaluating a time stamp associated with the item, evaluating a version number associated with the item, evaluating a time stamp associated with a prior indexing of the item, and evaluating a version number that is associated with the prior indexing of the item.

7. A method for indexing items located within a predetermined scope in response to a search query, comprising:
receiving the search query including one or more terms;
identifying the predetermined scope associated with the search query;
evaluating an up-to-date status associated with indexing of items within the predetermined scope; wherein the evaluating includes determining whether each term within the search query is contained within an index as created before receiving the search query;
retrieving partial results that include the portion of the items within the predetermined scope that were previously indexed and unchanged since the last indexing;
grouping items into processing batches, where the grouped items are associated with that items that were not previously indexed;
grouping additional items into processing batches in response to receiving the search query, where the additionally grouped items correspond to indexed items that are currently out-of-date;
initiating an indexing process for the processing batches;
retrieving indexing results for items within the predetermined scope that are up-to-date; wherein the indexing results are retrieved in response to receiving the search query; and
retrieving indexing results for items within the predetermined scope that are out-of-date as each processing batch has completed the indexing process; wherein the indexing results are retrieved in response to receiving the search query.

8. The method of claim 7, wherein each processing batch has an associated batch identifier, wherein each indexing result references the batch identifier.

9. The method of claim 7, wherein each search query has an associated query identifier, and wherein each indexed result references the query identifier.

10. A system for indexing items located within a predetermined scope in response to a search query, comprising: a query process stored on a computer readable storage medium and executed on a processor, wherein the query process is arranged to receive the search query including one or more search terms, wherein the query process is arranged to: evaluate the search query, request an indexing associated with the search query, and retrieve index results associated with the search query; and an index process stored on the computer readable storage medium and executed on the processor, wherein the index process is arranged to communicate with the query process, wherein the index process is arranged to: receive requests for indexing associated with the search query, evaluate an up-to-date status associated with the search query within the predetermined scope, provide index results for previously indexed items that are found within the predetermined scope, retrieving partial results that include the portion of the items within the predetermined scope that were previously indexed and unchanged since the last indexing, initiate indexing of items that are found within the predetermined scope, and report indexing results to the query process on an ongoing basis as indexing is completed for groups of items organized into batches and continuing for other items; wherein the reporting the indexing results is in response to receiving the search query; wherein evaluating the up-date status comprises determining whether each term within the search query is contained within an index as created before receiving the search query.

11. The system of claim 10, wherein the index results associated with search queries are stored in a data store.

12. The system of claim 10, further comprising a data store, wherein the data store includes information that is organized according to a data structure that identifies at least one member of a group comprising: the status associated with an indexed item, a time stamp associated with the indexed item, a version number associated with the indexed item, a time stamp associated with the item, and a version number associated with the item.

13. The system of claim 10, wherein the index process includes a data store that is arranged to store index results associated with the search query.

14. The system of claim 10, wherein the index process includes a data store, wherein the data store includes information that is organized according to a data structure that identifies at least one member of a group comprising: the status associated with an indexed item, a time stamp associated with the indexed item, a version number associated with the indexed item, a time stamp associated with the item, and a version number associated with the item.

15. The system of claim 10, wherein the index process includes an index service that is arranged to initiate indexing functions for the groups of items that are being indexed by the indexing process.

16. The system of claim 10, wherein the query process registers for notifications associated with a search query according to a query identifier, such that the query process is notified of completed indexing with reference to the query identifier.

17. The system of claim 16, wherein the query process requests results from the index process after notification is received when indexing is completed with reference to the query identifier.

18. The system of claim 10, wherein the query process registers for notifications associated with the search query, wherein the index process assigns batch identifiers to groups of items that are indexed in response to the search query, and wherein the index process notifies the query process when indexing is completed for a specified batch with reference to the batch identifier.

19. The system of claim 18, wherein the query process requests results from the index process after notification is received when indexing is completed for the specified batch with reference to the batch identifier.

20. A computer readable storage medium containing computer-executable instructions that describe a method for indexing items located within a predetermined scope in response to a search query, comprising:
- initiating the search query including one or more search terms within the predetermined scope;
- requesting indexing in response to the search query as bounded by the predetermined scope;
- checking an up-to-date status associated with the indexing of the items bounded by the predetermined scope; wherein the checking the up-date status comprises determining whether each term within the search query is contained within an index as created before receiving the search query;
- retrieving index results associated with items in the predetermined scope that are up-to-date based on the status check; wherein the indexing results are retrieved in response to initiating the search query;
- creating batches of items for indexing, wherein the batches are associated with items that are either out-of data based on the status check, or not indexed;
- indexing the batches; and
- retrieving index results for indexed batches as they are completed on an ongoing basis; wherein the indexing results are retrieved in response to initiating the search query.

21. The computer readable storage medium claim 20, further comprising computer-executable instructions that describe: applying a heuristic to determine appropriate groups of items in each batch.

22. The computer readable storage medium claim 20, further comprising computer-executable instructions that describe: reducing the number of items in each batch to increase a priority level associated with indexing.

23. The computer readable storage medium claim 20, further comprising computer-executable instructions that describe: binning items associated with the batches in a priority queue.

* * * * *